United States Patent Office 3,528,973
Patented Sept. 15, 1970

3,528,973
1,3-THIAZINES
Klaus Thewalt and Gustav Renckhoff, Witten (Ruhr), Germany, assignors to Dynamit Nobel AG, Troisdorf, Germany
No Drawing. Filed May 9, 1968, Ser. No. 728,075
Claims priority, application Germany, May 9, 1967, D 53,039
Int. Cl. C07d 93/06, 93/38
U.S. Cl. 260—243
7 Claims

ABSTRACT OF THE DISCLOSURE 1,3-N-S-heterocyclic compounds having the general formula:

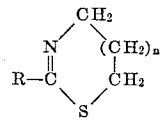

wherein $n$ is 1 or 2 and R is an alkyl group of 2 to 12 carbon atoms, and a process for preparing them by reacting hydroxyalkylamides of the general formula,

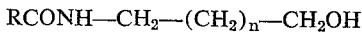

with phosphorus pentasulfide. The subject compounds exhibit bactericidal and fungicidal activity.

BACKGROUND OF THE INVENTION

This invention relates to 1,3-N-S-heterocyclic compounds. More particularly, it relates to a process for the preparation of 1,3-N-S-heterocyclics by reaction between hydroxyalkylamides and phosphorus pentasulfide.

It is known in the prior art to react N-(2-hydroxyethyl)-amides with phosphorus pentasulfide to form 2-substituted-$\Delta^2$-thiazolines. Reactions of this type are discussed in papers by H. Wenker, J. Am. Chem. Soc., 57, 1079 (1935) and J. C. Sheehan and J. J. Ryan, J. Am. Chem. Soc., 73, 4370 (1951). However, the compounds resulting from these reactions do not possess, for example, a strong bactericidal and fungicidal property.

SUMMARY OF THE INVENTION

One of the objects of the present invention is to provide a process for the preparation of 1,3-N-S-heterocyclic compounds which possess desirable properties which may be advantageously employed.

Another object of the present invention is to provide a process for the preparation of novel and useful 1,3-N-S-heterocyclic compounds which may be carried out in an efficacious and simple manner.

A further object of the invention is to provide a process for the preparation of 1,3-N-S-heterocyclics which may be carried out advantageously to give a good yield of product.

A still further object of the invention is to provide 1,3-N-S-heterocyclic compounds.

These and other objects and advantages of the present invention will become apparent to those skilled in the art from a consideration of the following specification and claims.

In accordance with the present invention, it has been found that hydroxyalkylamides of the general formula

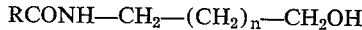

wherein $n$ is 1 or 2 and R is a straight or branched-chain alkyl group of 2 to 12 carbon atoms, can be reacted with phosphorus pentasulfide to give N-S-heterocyclic compounds of the general formula

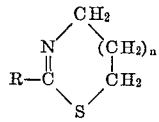

wherein $n$ and R have the same meanings as is indicated hereinabove. In this reaction, the hydroxylalkylamides of the above-mentioned formula are stirred with heating, optionally with a slight molar excess of phosphorus pentasulfide, the reaction taking place during this procedure. After gently diluting the resultant reaction mixture with aqueous NaOH, the product is extracted and distilled.

The novel compounds of the present invention are classified among the 4,5-dihydro-6H-1,3-thiazines and the 4,5,6,7-tetrahydro-1,3-thiazepines. In contrast to the $\Delta^2$-thiazolines, they exhibit a surprisingly strong bactericidal and fungicidal effectiveness. Thus, the compounds of the present invention substantially prevent the growth of Escherichia coli, Staphylococcus aureus and various types of fungi, such as Aspergillus niger and blue rot (such as Pullularia pullulans), even at concentrations of less than 0.05% by weight in an agar-agar solution. Furthermore, these compounds exhibit a neutral behavior with respect to the skin and, thus, can be advantageously also employed in cosmetic mixtures.

The following examples are given merely as illustrative of the present invention and are not to be considered as limiting. Unless otherwise noted, the percentages therein and throughout the application are by weight.

EXAMPLE 1

Twenty-three g. (0.1 mole) of decanoic acid-N-(3-hydroxypropyl)amide and 22.5 g. (0.1 mole) of $P_2S_5$ are gradually heated with agitation in a 1-liter enamel beaker. During the reaction, taking place with the vigorous development of smoke and between 60° and 100° C., a clear oil is formed. The reaction mixture is brought to a pH of 8 by the dropwise addition of 5% aqueous NaOH; strong foaming occurs during this step.

The reaction mixture is extracted with chloroform, washed until neutral with water, filtered over $Na_2SO_4$ and then the solvent is distilled off. Fractional distillation of the residue on a 10 cm.-Vigreux column results in the following product—

14 grams (a 62% theoretical yield) of 2-nonyl-4,5-dihydro-6H-1,3-thiazine
B.P.$_{0.5}$: 124° C.
$n_D^{20}$: 1.4990
S: 14.10% (calculated); 14.45% (found).

In accordance with the procedure described in Example 1, the following compounds are obtained:

EXAMPLE 2

From caproic acid-N-(3-hydroxypropyl)-amide (0.1 mole) and $P_2S_5$ (0.1 mole)—

15 g. (88% of the theoretical yield) of 2-pentyl-4,5-dihydro-6H-1,3-thiazine
B.P.$_{0.5}$: 77° C.
$n_D^{20}$: 1.5092.

EXAMPLE 3

From caprylic acid - N - (3 - hydroxypropyl) - amide (0.1 mole) and $P_2S_5$ (0.1 mole)—

14 g. (70% of the theoretical yield) of 2-heptyl-4,5-dihydro-6H-1,3-thiazine
B.P.$_{0.8}$: 107° C.
$n_D^{20}$: 1.5031
S: 16.65% (calculated); 16.70% (found).

EXAMPLE 4

From lauric acid - N - (3 - hydroxypropyl) - amide (0.1 mole) and $P_2S_5$ (0.1 mole)—

13 g. (a 51% theoretical yield) of 2-undecanyl-4,5-dihydro-6H-1,3-thiazine $B.P._{1.0}$: 160° C.
$n_D^{20}$: 1.4958.

EXAMPLE 5

From nonanoic acid - N - (3 - hydroxypropyl) - amide (0.2 mole) and $P_2S_5$ (0.2 mole)—

28 g. (66% of the theoretical yield) of 2-octyl-4,5-dihydro-6H-1,3-thiazine $B.P._{0.9}$: 107° C.
$n_D^{20}$: 1.4982
S: 14.99% (calculated); 14.80% (found).

EXAMPLE 6

From enanthic acid - N - (3 - hydroxypropyl) - amide (0.155 mole) and $P_2S_5$ (0.155 mole)—

20 g. (70% of the theoretical yield) of 2-hexyl-4,5-dihydro-6H-1,3-thiazine $B.P._{1.5}$: 92° C.
$n_D^{20}$: 1.5050.

In an analogous manner, other 1,3-N-S-heterocyclic compounds within the defined general formula can be prepared. Thus, derivatives of these heterocyclics wherein R is, for example, ethyl, n-propyl, i-propyl, n-butyl, s-butyl, i-butyl, t-butyl, n-pentyl, i-pentyl, hexyl, heptyl, octyl, nonyl, decyl, undecyl, dodecyl and branched-chain derivatives thereof can be made in accordance with the present invention, and where $n$ is either 1 or 2 in the recited formula.

Gentle heating is used during the reaction, preferably 60–100° C., although this can be varied somewhat depending upon the particular reactants employed. Advantageously, at least equimolar quantities of phosphorus pentasulfide are used, and a molar excess thereof is preferred. At the conclusion of the reaction, the product is recovered by neutralizing the reaction mixture with a base, e.g., an alkaline solution such as sodium hydroxide, and then separating the resultant 1,3-N-S-heterocyclics from the water-soluble phosphorus and sulfur compounds in a conventional manner, for example, by extraction with an organic solvent, distillation of the solvent, and then fractional distillation of the residue.

The invention being thus described, it will be obvious that the same may be varied in many ways. Such variations are not to be regarded as a departure from the spirit and scope of the invention and all such modifications are intended to be included within the scope of the following claims.

We claim:
1. A 1,3-N-S-heterocyclic compound of the formula:

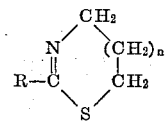

wherein $n$ is 1 or 2 and R is an alkyl group of 2 to 12 carbon atoms.

2. 2-nonyl-4,5-dihydro-6H-1,3-thiazine.
3. 2-pentyl-4,5-dihydro-6H-1,3-thiazine.
4. 2-heptyl-4,5-dihydro-6H-1,3-thiazine.
5. 2-undecanyl-4,5-dihydro-6H-1,3-thiazine.
6. 2-octyl-4,5-dihydro-6H-1,3-thiazine.
7. 2-hexyl-4,5-dihydro-6H-1,3-thiazine.

References Cited

Wenker: J. Am. Chem. Soc., vol. 57, pp. 1079–80 (1935).

Sheehan et al.: J. Am. Chem. Soc., vol. 73, pp. 4367–72 (1951).

Iwakura et al.: J. Org. Chem., vol. 31, pp. 3352–6 (1966).

HENRY R. JILES, Primary Examiner

J. M. FORD, Assistant Examiner

U.S. Cl. X.R.

260—327, 999